United States Patent
Omoto et al.

(10) Patent No.: US 9,311,947 B2
(45) Date of Patent: Apr. 12, 2016

(54) METAL MAGNETIC POWDER AND PROCESS FOR PRODUCING THE SAME, MAGNETIC COATING MATERIAL, AND MAGNETIC RECORDING MEDIUM

(75) Inventors: Hirohisa Omoto, Tokyo (JP); Takayuki Kikuchi, Tokyo (JP); Toshihiko Ueyama, Tokyo (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 553 days.

(21) Appl. No.: 13/638,151

(22) PCT Filed: Mar. 31, 2011

(86) PCT No.: PCT/JP2011/058358
§ 371 (c)(1),
(2), (4) Date: Nov. 5, 2012

(87) PCT Pub. No.: WO2011/125914
PCT Pub. Date: Oct. 13, 2011

(65) Prior Publication Data
US 2013/0048902 A1 Feb. 28, 2013

(30) Foreign Application Priority Data
Mar. 31, 2010 (JP) .................. 2010-082894

(51) Int. Cl.
| H01F 1/147 | (2006.01) |
| H01F 1/20 | (2006.01) |
| G11B 5/712 | (2006.01) |
| B22F 1/02 | (2006.01) |
| H01F 1/06 | (2006.01) |

(52) U.S. Cl.
CPC . *G11B 5/712* (2013.01); *B22F 1/02* (2013.01); *H01F 1/065* (2013.01); *C22C 2202/02* (2013.01)

(58) Field of Classification Search
CPC ................... H01F 1/065; H01F 1/33
See application file for complete search history.

(56) References Cited

U.S. PATENT DOCUMENTS 4,361,621 A * 11/1982 Isobe et al. .............. 428/329
7,854,807 B2 * 12/2010 Yoshida et al. ........... 148/309
(Continued)

FOREIGN PATENT DOCUMENTS

| JP | A-56-30707 | 3/1981 |
| JP | A-2003-263720 | 9/2003 |

(Continued)

OTHER PUBLICATIONS

International Search Report issued in International Patent Application No. PCT/JP2011/058358 mailed Jun. 21, 2011.

*Primary Examiner* — Jie Yang
*Assistant Examiner* — Xiaowei Su
(74) *Attorney, Agent, or Firm* — Oliff PLC (57) ABSTRACT

A metal magnetic powder having a metal magnetic phase mainly composed of ferromagnetic elements, and composed of particles containing one or more kinds of elements selected from rare earth elements including Y, and Al, Si. And the method for producing the metal magnetic powder, including the steps of: eluting the non-magnetic components in the particles under an action of a reducing agent acting on the metal magnetic powder, in a solution containing a complexing agent capable of forming the complex with the non-magnetic components; and forming an oxide layer on the particles in the solution after eluting the non-magnetic components into the solution, without drying the particles.

9 Claims, 2 Drawing Sheets (56) References Cited

U.S. PATENT DOCUMENTS

2007/0059557 A1* 3/2007 Shoji et al. .............. 428/692.1
2007/0227302 A1* 10/2007 Yoshida et al. ............ 75/348
2011/0123830 A1* 5/2011 Tohji et al. ............... 428/800

FOREIGN PATENT DOCUMENTS

| JP | A-2007-294841 | 11/2007 |
| WO | WO 2010/016154 A1 | 2/2010 |

* cited by examiner

METAL MAGNETIC POWDER AND PROCESS FOR PRODUCING THE SAME, MAGNETIC COATING MATERIAL, AND MAGNETIC RECORDING MEDIUM

TECHNICAL FIELD

The present invention relates to a metal magnetic powder and a method for producing the same suitable for high density magnetic recording, a magnetic coating material, and a magnetic recording medium.

DESCRIPTION OF RELATED ART

High recording density is required responding to a request for a larger capacity of a magnetic recording medium for the purpose of use of backup of data in a computer. In order to achieve the high recording density in the magnetic recording medium, a metal magnetic powder having a small particle volume is required. In order to respond to such a tendency, the present applicant also attempts to perform various improvements in a production technique of the metal magnetic powder, including a production method disclosed in patent document 1.

As is descried in a conventionally disclosed document (for example, patent document 1), typically the metal magnetic powder is mainly composed of iron. Then, the iron-based metal magnetic powder is generally produced industrially by a method comprising: containing a sintering inhibitor such as Si, Al, rare earth elements, and alkali earth metal elements in a needle-shaped powder mainly composed of iron oxyhydroxide or iron oxide, and thereafter reducing the metal magnetic powder by heat treatment.

When the characteristic of the metal magnetic powder is examined, it is found by inventors of the present invention, that addition of the sintering inhibitor into the metal magnetic powder needs to be relatively increased to maintain a shape of fine particles thus obtained. The sintering inhibitor exhibits an excellent effect for preventing sintering, when heat treatment such as reduction is performed.

Further, the inventors of the present invention disclose a method of reducing a particle volume of the metal magnetic particle in patent document 2.

PRIOR ART DOCUMENTS

Patent Documents

Patent document 1: Japanese Patent Laid Open Publication No. 2003-263720
Patent document 2: Japanese Patent Laid Open Publication No. 2007-294841

SUMMARY OF THE INVENTION

Problem to be Solved by the Invention

However, the inventors of the present invention obtain a knowledge that the sintering inhibitor is not preferable from a viewpoint of reducing a particle noise, because there is no influence at all on magnetism after heat treatment, and on the contrary, increase of a volume of the metal magnetic particle is invited.

In addition, as a result of a further examination by the inventors of the present invention, it is found that even in a case of using a method for reducing the particle volume of the metal magnetic particle, which is the method disclosed conventionally, dramatic improvement of the magnetic characteristic is not invited in a produced magnetic recording medium in some cases. Therefore, as a result of a further examination by the inventors of the present invention, it is found that there is a possibility that dispersibility of the metal magnetic particle is reduced, or affinity in mixing the metal magnetic particle into an organic material such as resin is reduced, or dispensability is reduced, by an operation of the method of reducing the particle volume of the metal magnetic particle.

In view of the above-described circumstance, the present invention is provided, and in order to solve a technical problem, an object of the present invention is to provide the metal magnetic powder composed of metal magnetic particles having a reduced particle volume in which a mixture state of mixing with the organic material such as resin (described as "affinity" in some cases in the present invention) is improved and further dispensability of the metal magnetic particle into the organic material such as resin is improved, and a method for producing the same, and a coating and a magnetic recording medium using the metal magnetic powder.

Means for Solving the Problem

It is found by the inventors of the present invention that the aforementioned problem can be solved by the magnetic powder obtained by the method for producing the metal magnetic powder having the aforementioned step.

Namely, according to a first aspect of the present invention, there is provided a method for producing a metal magnetic powder having a metal magnetic phase mainly composed of ferromagnetic elements, and composed of particles containing one or more kinds of elements selected from rare earth elements including Y, and Al, Si as non-magnetic components, comprising the step of:

eluting the non-magnetic components in the particles under an action of a reducing agent acting on the metal magnetic powder, in a solution containing a complexing agent capable of forming the complex with the non-magnetic components; and forming an oxide layer on the particles in the solution after eluting the non-magnetic components into the solution, without drying the particles.

According to a second aspect of the present invention, there is provided the method for producing a metal magnetic powder of the first aspect, wherein the step of forming the oxide layer is the step of oxidizing the particle by peroxide, in a state that the non-magnetic components are eluted into the solution.

According to a third aspect of the present invention, there is provided the method for producing a metal magnetic powder of the first or the second aspect, comprising the step of dispersing the particles in pure water after the step of forming the oxide layer, and replacing the pure water by an organic solvent.

According to a fourth aspect of the present invention, there is provided the method for producing a metal magnetic powder of any one of the first to third aspects, comprising the step of drying the particles after the step of forming the oxide layer.

According to a fifth aspect of the present invention, there is provided a metal magnetic powder having a metal magnetic phase mainly composed of ferromagnetic elements, and composed of particles containing one or more kinds of elements selected from rare earth elements including Y, Al, and Si, wherein an isoprotic point is 7.0 or more;

an average long axial length of a particle is 10 to 50 nm;

an average particle volume of the particle including an oxide layer is 5000 nm$^3$ or less; and a value of (R+Al+Si)/(Fe+Co) atomic ratio calculated using a value of a content (atom %) of each element contained in the particle is 20% or less, wherein R is a rare earth element containing Y, and a content of one kind or two kinds selected from R, Al, Si is 0 in some cases.

According to a sixth aspect of the present invention, there is provided the metal magnetic powder of the fifth aspect, wherein a powder pH value measured by a boiling extraction method (JISK-5101-17-1:2004) is 7.0 or more.

According to a seventh aspect of the present invention, there is provided the metal magnetic powder of the fifth or the sixth aspect, wherein an adsorption amount of an organic acid (stearic acid) per unit area, adsorbed on a particle is 1.2 mg/m$^2$ or more.

According to an eighth aspect of the present invention, there is provided the metal magnetic powder of any one of the fifth to seventh aspects, wherein a crystallite size calculated by Fe (110) is 11.5 nm or less, and an average value of the number of present crystallites per unit volume of a particle obtained by dividing an average particle volume V(nm$^3$) of the particle by a crystallite volume (nm$^3$) calculated as a spherical shape, is 6.0 or less.

According to a ninth aspect of the present invention, there is provided a magnetic coating material including the metal magnetic powder described in any one of the fifth to eighth aspects.

According to a tenth aspect of the present invention, there is provided a magnetic recording medium including the metal magnetic powder described in any one of the fifth to eighth aspects.

Advantage of the Invention

The metal magnetic powder having the above-descried structure exhibits excellent characteristics, having an isoprotic point of 7.0 or more, having an improved affinity with a coating resin used for the magnetic recording medium, having an excellent orientation, having a high coercive force, and having a low value of SFD$_x$.

DETAILED DESCRIPTION OF THE INVENTION

In a method based on a conventional technique as well, after executing the "step of producing a metal magnetic powder" and the "step of removing a sintering inhibitor", a metal magnetic particle and a process liquid are separated so that the metal magnetic particle is dried, and an oxide layer is formed on the metal magnetic particle again, to thereby obtain the metal magnetic powder.

However, in the method based on the conventional technique, magnetic characteristics of a magnetic recording medium including the metal magnetic powder are not so improved as expected, irrespective of a remarkable reduction of a particle volume of the obtained metal magnetic powder, compared with a case before removing the sintering inhibitor.

As a result of examining a cause of not improving the magnetic characteristics by the inventors of the present invention, it is found that dispersibility of the metal magnetic powder and affinity with resin are reduced by the operation in the "removing step of removing the sintering inhibitor" and further the metal magnetic particles are agglutinated again in a drying step. Namely, it can be considered that the metal magnetic particles cannot be sufficiently dispersed when the metal magnetic powder is made into coating based on the conventional technique, due to low dispersibility of the metal magnetic powder and low affinity with resin, and re-agglutination of the metal magnetic particles. If the metal magnetic particles cannot be sufficiently dispersed when the metal magnetic powder is made into magnetic coating material, a volume that acts as the metal magnetic powder in the magnetic coating material becomes larger than the individual metal magnetic particle (so-called increase of "activation volume").

As a result, it can be considered that an effect of improving the expected magnetic characteristics is canceled by an effect of reducing the particle volume in the metal magnetic particle.

Based on the aforementioned knowledge, the inventors of the present invention achieve a structure of suppressing the agglutination of the metal magnetic particles by providing a "wet-type stabilizing step" of forming an oxide layer once in the wet-type stabilizing step not through the drying step after the "removing step of removing the sintering inhibitor" and a structure of suppressing the agglutination at the time of drying the metal magnetic powder to obtain a dried powder by providing a "solvent replacing step" of replacing a water component covering the surface of the metal magnetic particle, with an organic material.

The present invention will be described in detail hereafter, while describing a method for producing the metal magnetic powder, the metal coating, and the magnetic recording medium according to the present invention.

<Step of Producing the Metal Magnetic Powder>

A raw material of the metal magnetic powder according to the present invention can be obtained by a publicly-known method. More specifically, the raw material can be obtained by reducing α-FeOOH (goethite) or α-Fe2O3 (haematite) in a reductive atmosphere such as a hydrogen atmosphere and a hydrogen-containing atmosphere. Note that aluminum and rare earth elements being sintering inhibitors, are contained in the α-FeOOH and the α-Fe2O3.

Although the reduction is preferably performed under a condition of about 300 to 700° C., a "multiple stage reduction method" may be used as needed, in which a reduction temperature is set to two stages or more. When the multiple stage reduction method is used, a method of performing reduction under a low temperature condition first, and performing reduction under a high temperature condition next, is preferable.

A size of the produced metal magnetic powder is not limited. However, the effect of the present invention can be most remarkably obtained when the metal magnetic particle has a needle-shape or an almost the needle-shape, having an average long axial length of 10 to 50 nm, preferably 10 to 45 nm, and further preferably 10 to 30 nm calculated from a TEM image.

The obtained raw material of the metal magnetic powder is exposed to oxygen-containing gas atmosphere such as air under a condition of 60 to 150° C., and a stabilizing coating is formed on the surface, to thereby obtain the metal magnetic powder. A modifying operation of the surface oxide layer may be performed as needed, by exposing the metal magnetic powder to the reduction atmosphere.

<Reducing Step of Reducing the Sintering Inhibitor (Non-Magnetic Component)>

Aluminum and rare earth elements being the non-magnetic components added as the sintering inhibitor is reduced from the obtained metal magnetic powder, to thereby obtain the metal magnetic powder with a reduced volume of the metal magnetic particle.

As a specific operation, the obtained metal magnetic powder is dispersed in a solvent, to thereby obtain a dispersion liquid. A complexing component capable of forming the complex with aluminum or rare earth elements being the non-magnetic components, is added into the dispersion liquid. Thereafter, a reducing agent having a reduction power is added into the dispersion liquid.

By this operation, the non-magnetic component that exists on the surface of the metal magnetic particle can be dissolved and reduced.

In the reducing step of reducing the sintering inhibitor, tartrate, citrate, malate, and lactate are suitably used as the complexing component. Further, hydrazine, sodium boronhydride, aluminum lithium hydride, etc., are preferably selected as the reducing agent, because a removing operation of removing the sintering inhibitor can be easily performed. Of course, such complexing agent and reducing agent may be used alone respectively or a plurality of them may be used together.

<Wet-type Stabilizing Step>

In the present invention, in order to suppress the re-agglutination of the metal magnetic particles, and in order to set a region in which the isoprotic point of the metal magnetic particle is set to pH=7.0, the "wet-type stabilizing step" of forming the oxide layer on the surface is executed in this solution in a wet state, without drying the metal magnetic particle in a state that the non-magnetic component is eluted into the solution. In this wet-type stabilizing step, the oxide layer is preferably formed on the surface of the metal magnetic particle, and more preferably a uniform oxide layer is formed. In order to form the uniform oxide layer, a peroxide, etc., is preferably added in the wet-type stabilizing step. More specifically, an oxidizing agent such as an inorganic peroxide and potassium chromate, or an organic peroxide can be given. However, the inorganic peroxide, and above all, hydrogen peroxide solution is preferably used.

A reaction temperature in the wet-type stabilizing step is 0 to 50° C., and further preferably 10 to 40° C. Therefore, a liquid temperature is set to 50° C. or less. Non-uniformity of an oxide layer forming reaction in the metal magnetic particle is suppressed by keeping the aforementioned reaction temperature, so that a uniform oxide layer can be formed, thus contributing to improvement of the magnetic characteristics of the metal magnetic powder.

Addition of the peroxide may be 0.001 mol or more preferably 0.005 mol or more, and further preferably 0.01 mol or more, over 1 g of the metal magnetic powder to be processed. By satisfying this addition amount, the oxide layer is sufficiently formed on the metal magnetic particle, thus preferably stabilizing the metal magnetic powder, and improving stable preservation.

Meanwhile, the addition amount of the peroxide is preferably 0.05 mol or less, over 1 g of the metal magnetic powder to be processed. This is because by avoiding excessive oxidation of the metal magnetic particle, reduction of the volume of the metal magnetic particle can be avoided, which is suitable as a raw material of the high density magnetic medium as a result.

<Solvent Replacing Step>

After the aforementioned "wet-type stabilizing step", the metal magnetic powder and a process liquid are separated from each other by a publicly-known method. Then, the separated metal magnetic powder is dispersed into clear pure water once, to thereby remove a component generated in the "wet-type stabilizing step" and adhered and remained to/on the surface of the metal magnetic particle. When the metal magnetic powder is dispersed into the pure water, the pure water may be stirred or ultrasonic cleaning may be used. Then, after the metal magnetic powder is dispersed in the pure water, separating operation is performed again, to thereby separate the metal magnetic powder and a cleaning liquid. Thereafter, the metal magnetic powder is dispersed again into the organic solvent, to thereby obtain an organic solvent dispersion liquid of the metal magnetic powder.

In such an operation of obtaining the organic solvent dispersion liquid, a temperature for the operation is not particularly limited. However, the operation is preferably performed at a temperature lower than a volatilization temperature of the used organic medium. Further, toluene, methyl ethyl ketone, and cyclohexanone, etc., can be given as a preferable organic solvent used at this time.

Further, re-dispersing operation into the organic solvent is preferably performed once or more, and several number of times, to further promote the replacement of the water content and the organic material remained on the surface of the metal magnetic particle.

After the processing has undergone the above-described operation, it is also preferable that drying is performed to obtain a dried powder of the metal magnetic powder. According to this structure, owing to an effect of coating the surface of the metal magnetic particle with the organic material, remarkable agglutination is hardly generated, which is observed when the surface is coated with water. Therefore, agglutination of a conventional powder hardly occurs, even if the dried powder of the metal magnetic powder is produced by the drying step, from the organic solvent dispersion liquid of the metal magnetic powder. Then, in a case of a dried metal magnetic powder, relatively softer metal magnetic powder than that in a case of a water dispersion can be obtained, which is preferably suitable for treating. Note that a coating effect of the organic material is reduced by performing the drying step at an excessively high temperature. Therefore, it is appropriate to perform the drying step at a low temperature for a long time. More specifically, the temperature is preferably set to 100° C. or less, preferably set to 80° C. or less. As a result of performing the aforementioned operation, the metal magnetic powder having excellent dispersibility can be obtained.

(Structure of the Metal Magnetic Powder)

The magnetic powder according to the present invention has physical characteristics, more specifically physical properties as follows.

<Measurement of a Shape and a Volume of the Metal Magnetic Particle>

An average primary particle diameter of the metal magnetic particle of the present invention was measured using a Transmission Electron Microscope (JEM-100CX Mark-11 by JEOL Ltd.). A bright field image obtained by observing the metal magnetic powder of the present invention at an accelerating voltage of 100 kV, was photographed, and about 300 metal magnetic particles were selected, and the average primary particle size was measured.

The shape of the metal magnetic particle of the present invention is a needle-shape, a spindle-shape, and a flat-needle-shape. The flat-needle-shape called here is one mode of a needle-shaped particle, and the shape at the time of cutting the metal magnetic particle by a short axis is not a circular shape but an oval shape. The shape can be judged by the Transmission Electron Microscope. More specifically, there is a method of inclining the metal magnetic particle to confirm a degree of separation of a cross-sectional face from the circle, and a method of confirming a cross-sectional ratio by shadowing. Note that by these methods, it is found that the shape of the metal magnetic particle is the spindle-shape, with its cross-sectional face judged to be a circle.

When the size of the metal magnetic particle according to the present invention is the needle-shape or almost the needle-shape, the long axial length is 10 to 50 nm, preferably 10 to 45 nm, and further preferably 10 to 30 nm. By setting the long axial length of the metal magnetic particle of the present invention in this range, high density magnetic recording is achieved.

If the long axial length is set to 50 nm or less, an appropriate size of the metal magnetic particle can be set, thus preferably providing a magnetic powder that achieves the high density magnetic recording. Further, in the metal magnetic particle with the long axial length set to 10 nm or more, a problem of magnetic loss (super para) caused by pulverizing the metal magnetic particle can be prevented.

Meanwhile, in a case of the metal magnetic particle that exhibits magnetism by shape magnetic anisotropy, an axial ratio is an important factor, and at least two or more axial ratios are requested.

Further, regarding the size of the particle, the particle volume calculated by oval column approximation of the metal magnetic particle namely, ((value calculated by (average short axial length/2)$^2$×circular constant×average long axial length)) is 5000 nm$^3$ or less, and a finer particle has 3500 nm$^3$ or less, and a further finer particle has 2500 nm$^3$ or less. The finer metal magnetic particle volume contributes to a reduction of a particle noise. Accordingly, the finer particle volume is preferable from this viewpoint. However, as described above, if the particle volume becomes excessively finer, the magnetism of the metal magnetic particle is lost (super para), and the magnetic characteristic cannot be exhibited. Therefore, in order to avoid such a circumstance, the particle volume is preferably 100 nm$^3$ or more.

The metal magnetic powder of the present invention contains the non-magnetic component such as aluminum, silicon, and rare earth elements (the rare earth elements include Y, described "R" in some cases in the present invention), mainly composed of one or more kinds of ferromagnetic elements such as Fe, Ni, Co, although the reduced amount of non-magnetic component is contained. More specifically, an atomic ratio of [non-magnetic component (R+Si+Al)]/[magnetic component (Fe+Co)] is 20% or less, and 15% or less in a case of a further reduction, and 12% or less in a case of a still further reduction. Usually, the non-magnetic component exists outside of a metal core, to prevent sintering. Accordingly, there is an effect of reducing the metal magnetic particle volume by reducing the non-magnetic component. Further, high magnetic characteristics per metal magnetic particle volume can be obtained.

However, in addition to a case that all of the non-magnetic components R, Si, Al exist, there is also a case that two kinds or one kind selected from R, Si, Al exits. For example, in a case that two kinds selected from R, Si, Al exists, one kind that does not exist is 0, and in a case that one kind selected from R, Si, Al exists, two kinds that do not exist is 0.

<Crystallite Size of the Metal Magnetic Powder, and Calculation of Crystallite Volume>

The crystallite size of the metal magnetic powder according to the present invention is calculated by a powder X-ray diffraction method. More specifically, the size of Fe (110) plane is calculated using a Scherrer method. In this specification, a half value width of Fe(110) is used for calculation. A result described in the present application is based on a result using a Co bulb for an X-ray source.

More specifically, the crystallite size is obtained using an X-ray diffractometer (RINT-2100 by Rigaku Corp.). X-ray shows a tendency of a broad peak particularly in a case of a fine particle, and therefore a measurement range is set in a range of 2θ=45 to 60° to be scanned and measured. A scan speed is set to 5°/minute, and the number of integrations is set to 5 times.

In the metal magnetic powder according to the present invention, the crystallite size calculated based on (formula 1) described below is 11.5 nm (115 Å) or less, preferably 11.0 nm (110 Å) or less, and further preferably 10.5 nm (105 Å) or less. When the crystallite size is set to 11.5 nm or less, the particle noise is not large at the time of being made into a medium, and this state is preferable.

$$\text{Crystallite size in Fe(110)} = K\lambda/\beta \cos\theta \quad \text{(Formula 1)}$$

wherein K: Scherrer constant 0.9, λ: X-ray wavelength, β: Half value width of a diffraction peak (radian), θ: Diffraction angle (radian).

Then, it was estimated that the crystallite had a spherical shape, and a volume of the metal magnetic particle crystal was calculated by the calculated crystallite size and a calculation method of a spherical volume, namely $V=(4\pi/3)\times(\text{crystallite size}/2)^3$).

The number of crystallites per one metal magnetic particle can be calculated by comparing the volume of the metal magnetic particle crystal and the volume of the metal magnetic particle calculated by TEM. Accordingly, a thick oxide layer and a non-magnetic sintered material layer exist respectively on the surface of the metal magnetic particle, in a case of the metal magnetic powder of the conventional technique, thus increasing the volume. Namely, the number of the crystallites per one metal magnetic particle calculated by this method is a large value. However, from a viewpoint of the high density magnetic recording, less grain boundary parts (oxide layer, non-magnetic sintered material layer) are expected to contribute to the reduction of the particle noise. Accordingly, it can be considered that the less number of crystallites per one metal magnetic particle is preferable.

The number of crystallites per one metal magnetic particle calculated by this technique is 6 or less, preferably 5.5 or less, and further preferably 5.0 or less. Note that it can be said that one crystallite per one magnetic powder exist at minimum, and therefore the number of crystallites is 1.0 or more.

<Specific Surface Area of the Metal Magnetic Particle>

A specific surface area of the metal magnetic particle according to the present invention was measured using a BET one point method. 4 soap US by Yuasa Ionics Co., was used as a measurement apparatus.

<Calculation of Bulk Density of the Metal Magnetic Powder>

Bulk density of the metal magnetic powder according to the present invention can be measured based on a JIS method (JISK-5101: 1991).

Further, there is also a calculation method as described in Japanese Patent Laid Open Publication No. 2007-263860, comprising: filling a prescribed holder with powder being a measurement object to form a powder layer, and adding a prescribed pressure to the powder layer, and measuring a height of the powder layer, to thereby obtain a density of the powder being the measurement object from a measured value of the height of the powder layer and a weight of the filled powder. The value thus obtained indicates a tendency of easiness of clogging of the metal magnetic particle, and the metal magnetic powder with this value being high, is suitable for the high density recording.

<Isoprotic Point of the Metal Magnetic Particle>

The isoprotic point is a point where charge and release of proton is balanced and the charge and release of proton appears to be stopped in appearance between the metal magnetic particle and a circumferential solution, when the metal magnetic particle is charged into the solution having a prescribed pH.

A solution not containing the metal magnetic particle (blank solution) is used as a reference solution, and the isoprotic point can be measured by obtaining an intersection of a titration curve at the time of titrating the reference solution, and a titration curve at the time of similarly titrating a solution containing the metal magnetic particle.

As described above, the isoprotic point indicates the point where amounts of proton are balance, which is the proton released from the surface of the metal magnetic particle, and the proton supplied to the metal magnetic powder from the solution having a prescribed pH value. Namely, the isoprotic point is an index for knowing a state of a hydroxide group (functional group) that exits on the surface of the metal magnetic particle. The metal magnetic particle of the present invention has a property that the isoprotic point exists in a region of pH=7.0 or more.

Meanwhile, in the metal magnetic particle of the conventional technique in which the non-magnetic component is reduced, the isoprotic point is shifted to an acidity side under an influence of the reducing agent used for the elution of the non-magnetic component, and therefore the isoprotic point exists in a region of less than pH=7.0. Accordingly, an adverse influence is generated on the affinity between the metal magnetic particle of the conventional technique in which the non-magnetic component is reduced, and the usually used resin, thereby inviting an unfavorable result, Meanwhile, in the metal magnetic particle of the present invention, the wet-type stabilizing step is performed after the reducing step of reducing the sintering inhibitor (non-magnetic component), and therefore the isoprotic point exists in a region of neutrality where pH=7.0, or in a region of alkalinity where pH=7.5 or more. Although a detailed action mechanism of the metal magnetic particle of the present invention having such an isoprotic point is not clarified, it can be considered that the metal magnetic particle has an excellent compatibility effect with the resin for magnetic powder, thus improving the affinity with resin.

Further, as a result of improving the affinity between the metal magnetic particle of the present invention and the resin, it can be considered that improvement of the coercive force and reduction of SFDx value can be realized in the magnetic recording medium using the metal magnetic particle of the present invention, in addition to the effect of the aforementioned solvent replacing step.

<Surface Property Evaluation of the Metal Magnetic Particle (Release or Absorption of Proton)>

Further, surface property of the metal magnetic particle can be evaluated by examining whether proton is released or absorbed from the surface when the metal magnetic particle is charged into the solution having a prescribed pH value.

According to the examination by the inventors of the present invention, it is found that in a case of the metal magnetic particle of the present invention, preferably dilute nitric acid is gradually added into a potassium hydroxide solution of pH=11 containing the metal magnetic particle of the present invention, and when the potassium hydroxide solution reaches pH=5, the metal magnetic particle exhibits proton releasing property.

The metal magnetic particle exhibits proton releasing property when the solution reaches pH=5 by setting the pH value of the solution to pH=5. With this structure, repulsion among metal magnetic particles is generated, and high dispersibility in the solution can be exhibited even by the metal magnetic particle only, with no necessity for adding a dispersant separately.

A method for measuring the isoprotic point of the metal magnetic particle, and a method for evaluating the surface property will be specifically described hereafter.

0.05 g of a sample is prepared, which is obtained by disaggregating the metal magnetic powder of the present invention by a 500 mesh. This sample was added to the potassium hydroxide solution 100 mL of pH=11 containing potassium nitrate of 0.1 mol/L as a buffer solution. Then, 0.01 mol/L of nitric acid aqueous solution was added into the potassium hydroxide solution containing the metal magnetic powder of the present invention at a rate of 0.02 mL/minute, to thereby measure a variation of pH values.

The variation of the pH values in the solution can be measured using a streaming potential automatic titrator (AT-510Win/PCD-500 by KYOTO ELECTRONICS Manufacturing, LTD.). Here, it is preferable to measure the pH values in a state that the dispersibility of the metal magnetic powder in the solution is maintained. Therefore, in this measurement, the variation of the pH values was measured while stirring the solution using a magnetic stirrer.

Note that the potassium hydroxide solution or its alternative solution has an action of absorbing carbonic acid in the air, and therefore it is not preferable to use a solution after elapse of several days from preparation.

Meanwhile, similar nitric acid solution and potassium hydroxide solution as described above were prepared. Then, the nitric acid solution was added into the potassium hydroxide solution in which the magnetic powder of the present invention was not added similarly as described above, to thereby obtain the blank solution. Then, the variation of the pH values in the blank solution was measured, which was set as a base line of the variation of the pH values in the dispersion liquid of the metal magnetic powder.

Thus, an amount of proton (H+) was measured, which was released or absorbed by the metal magnetic particle, from the pH value measured when the magnetic powder of the present invention existed in the potassium hydroxide solution, and from the pH value of the base line when the magnetic powder of the present invention did not exist therein.

More specific calculation method will be described.

When the magnetic powder releases proton, the value is a minus (−) value, and when the magnetic powder absorbs proton, the value is a positive (+) value. Namely, if viewed from the pH value of the potassium hydroxide solution, the pH value takes an acidity side value (small value) relative to a reference (blank solution) when the magnetic powder releases the proton, and the pH value takes a basic value (large value) larger than the reference (blank solution) when the magnetic powder absorbs the proton.

The amount of proton ($H^+$)/the number of protons/$m^2$ per unit area of the metal magnetic particle, the proton being released to the potassium hydroxide solution or absorbed (accumulated) therein by the metal magnetic particle, is calculated by the following (formula 2). Wherein, $N_A$ indicates Avogadro's number (=$6.02 \times 10^{23}$).

It is a matter of course that the pH value measured in a case that the magnetic powder of the present invention exists in the potassium hydroxide solution used for the calculation, and the pH value on the base line in a case that the magnetic powder does not exist, are compared and calculated by a value obtained by adding the same amount of nitric acid into both solutions.

$$H^+ = \frac{\{10^{(a^*)} - 10^{(b^*)} \times N_A(6.02 \times 10^{23})\}}{(c^*) \times (d^*)} \quad \text{(Formula 2)}$$

($a^*$) ... pH value in a case of reference ($b^*$) ... pH value in a case of adding sample ($c^*$) ... Specific surface area(m$^2$/g) calculated by BET method ($d^*$) ... Sample amount (g) used for measurement The number of protons released or absorbed into the solution by the metal magnetic particle, is calculated by (formula 2), wherein the number of (H$^+$)/m$^2$ indicates how much the proton is given and received by adding powder in an environment of adding the same amount of proton to the solution. Namely, it can also be considered that the number of [releasing or absorbing] the proton shows sensitivity to the proton of the metal magnetic particle.

The metal magnetic particle of the conventional technique has a remarkable tendency of releasing proton. Such a tendency suggests a possibility that some residual component remains on a particle surface of the metal magnetic particle of the conventional technique.

Figure 1:
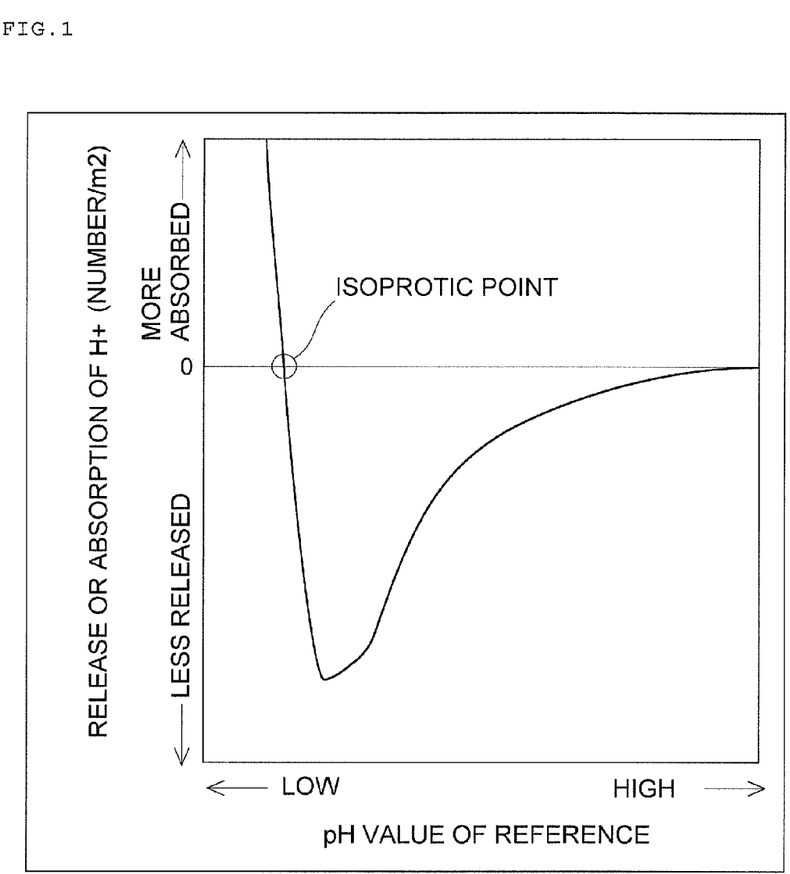
FIG. 1 is a schematic view of an adsorption or a release state of proton (H+) of a sample, calculated by evaluation based on titration.

FIG. 1 shows the tendency of releasing proton shown by the metal magnetic particle of the conventional technique.

FIG. 1 shows a graph in which the pH value of the reference (blank solution) is taken on the horizontal axis, and the number of (H$^+$)/m$^2$ [releasing or absorbing] the proton into the solution by the metal magnetic particle is taken on the vertical axis.

From FIG. 1, it is found that the metal magnetic particle of the conventional technique shows a tendency as follows: proton is absorbed when the pH value of the solution is low, and proton is absorbed as the pH value of the solution is increased, and release of proton is increased after passing through the isoprotic point where "the number of (H$^+$)/m$^2$ for releasing or absorbing proton=0". However, it is also found that the tendency of releasing proton is gradually decreased, as the pH value of the solution is further increased, and is gradually approached to a level of "the number of (H$^+$)/m$^2$ for releasing or absorbing proton=0" again.

Figure 2:
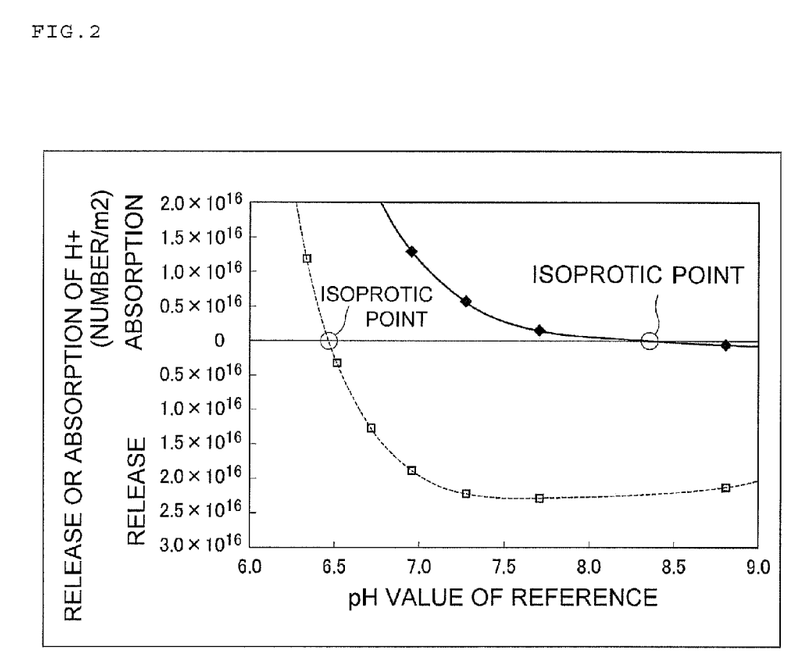
FIG. 2 is a view of a correlation of hydrogen dependency of proton released from the metal magnetic particle or adsorbed on the metal magnetic particle.

Although detailed description will be given later in example 1 and comparative example 1, FIG. 2 shows that the isoprotic point of the metal magnetic particle (plotted by ♦ and solid line) that has undergone the wet-type stabilizing step of the present invention was 8.3, and the isoprotic point of the metal magnetic particle (plotted by □ and broken line) that has not undergone the wet-type stabilizing step of the present invention was 6.5.

<Surface Property Evaluation of the Metal Magnetic Particle (Powder pH Value)>

The metal magnetic powder according to the present invention produced by the wet-type stabilizing step after the reducing step of reducing the sintering inhibitor (non-magnetic component) is the metal magnetic powder having pH=7 or more which is obtained by measuring the powder pH value defined in JIS method (JISK-5101-17-1: 2004/Pigment test method-17 Section: p H value—Chapter 1: boiling extraction method).

A measurement method of the pH value based on the JIS method will be specifically described.

A glass container with a lid put thereon was filled with pure water obtained by removing carbon dioxide gas from the liquid, and a prescribed amount of metal magnetic powder was added, to thereby prepare 10% suspension. Then, the lid of the glass container was kept open, and the suspension was heated and boiled for about 5 minutes in a boiling state, and thereafter was further continued to be boiled for 5 minutes. Thereafter, the lid was put on the container and the suspension was cooled to a normal temperature, and was replenished with water by a reduced amount by boiling, then waved and mixed for 1 minute and left to stand still for 5 minutes, to thereby measure the pH value of the suspension.

According to the examination by the inventors of the present invention, it is found that when the pH value of the metal magnetic powder thus measured is 7.0 or more, the magnetic powder having excellent dispersibility in the organic medium can be obtained. Although there are many unclear points regarding the reaction mechanism, probably there is an influence by the component eluted from the metal magnetic powder of the present invention, in consideration of a measurement principle. Namely, it can be considered that the component easily eluted from the metal magnetic powder of the present invention produced by the wet-type stabilizing step after the reducing step of reducing the sintering inhibitor (non-magnetic component), exhibits some operation and effect, and the dispensability into the organic solvent is influenced thereby.

<Composition Analysis of the Metal Magnetic Powder>

The composition of the metal magnetic powder of the present invention was obtained by performing mass analysis of an overall metal magnetic particle including the metal magnetic phase and the oxide layer. Quantity of Co, Al, and rare earth elements (treated as the rare earth elements containing Y) was determined using a high frequency inductively coupled plasma atomic emission spectrometry ICP (IRIS/AP) by Nippon Jarrell-Ash Co. Ltd. and quantity of Fe was determined using a HIRANUMA automatic titrator (COM-TIME-980 series).

Results of such determined quantities are given by mass %, and therefore the quantities are converted to atom % (at %) as needed, to thereby obtain Co/Fe number-of-atoms ratio, Al/(Fe+Co) number-of-atoms ratio, Y/(Fe+Co) number-of-atoms, (R+Al+Si)/(Fe+Co) number-of-atoms ratio.

Note that the value of Si/(Fe+Co) is a measurement limit or less in each example and comparative example as will be described later. Therefore, this value is regarded as 0 and (R+Al+Si)/(Fe+Co) number-of-atoms ratio is equal to (R+Al)/(Fe+Co) number-of-atoms ratio.

<Adsorption Amount of Organic Acid (Stearic Acid) of the Metal Magnetic Particle>

The organic acid (stearic acid) is adsorbed on a point corresponding to a basic point on the surface of the metal magnetic particle. Accordingly, the adsorption amount of the organic acid (stearic acid) on the metal magnetic particle can be an important index to know the dispersibility of the metal magnetic particle into the resin.

It is found that the metal magnetic powder of the present invention produced by the wet-type stabilizing step after the reducing step of reducing the sintering inhibitor (non-magnetic component), is the magnetic powder with the adsorption amount of the organic acid (stearic acid) per unit area maintained to be 1.2 mg/m² or more.

A specific calculation method of the organic acid (stearic acid) of the metal magnetic particle will be described.

2.0 g of a sample obtained by disaggregating the metal magnetic powder by a 30 mesh, was prepared in a glove box in which atmosphere is replaced with nitrogen. The sample was added into 15.0 g of a methyl ethyl ketone solution in which 2 mass % of stearic acid is dissolved, and the sample was agglutinated using a permanent magnet from below.

Wherein, 10 g of a supernatant liquid of the solution was taken, which was then placed on a hot plate and heated at 90° for 3 hours, to thereby measure a weight of a heated residue. A numerical value of the weight of the heated residue thus obtained was substituted into (formula 3).

$$A=1000 \times B \times (C/100) \times [1-E/\{(C/100) \times D\}]/F \quad \text{(Formula 3)}$$

Wherein A indicates stearic acid adsorption amount (mg/g), B indicates an overall weight (g) of the solution (15.0 g here), C indicates stearic acid concentration in the solution (mass %) (2 mass % here), D indicates the weight (g) of the supernatant liquid (10 g here), E indicates the weight (g) of the heated residue after heating for 3 hours, and F indicates the weight (g) of the sample (2 g here).

In (formula 3), B×(C/100) indicates the weight (g) of the stearic acid in the initial solution, and $[1-E/\{(C/100)\times D\}]$ indicates the ratio of the stearic acid present in the supernatant liquid.

<Magnetic Characteristic Evaluation of the Metal Magnetic Powder>

Regarding the metal magnetic powder of the present invention, a coercive force Hc, a saturation magnetization σs, a remanence ratio SQ, and BSFD (SFD value in a bulk state) under an external magnetic field, were measured.

More specifically, a plastic container of φ6 mm was filed with the metal magnetic powder of the present invention, and the external magnetic field 10 kOe (795.8 kA/m) was applied thereto using a VSM apparatus (VSM-7P) by TOEI INDUSTRY CO., LTD. and the coercive force Hc (Oe, kA/m), and the saturation magnetization σs (Am²/kg), to thereby calculate a magnetic characteristic value per unit volume.

Note that capability of the magnetic characteristic possessed by the metal magnetic powder itself can be evaluated by the value obtained by dividing the magnetic characteristic measured as described above, by a particle volume. When this value is large, this means that the non-magnetic component in the metal magnetic particle is reduced, which shows a state suitable for the high density magnetic recording.

Further, a weather resistance test of the metal magnetic particle is performed to evaluate the stability of the metal magnetic powder to an environment.

More specifically, for example the plastic container of φ6 mm was filled with the metal magnetic powder, to thereby measure the saturation magnetization value ($\sigma S_A$) using the VSM apparatus. Next, the metal magnetic powder was left to stand still under an environment of constant temperature and constant humidity of 60°80%. Then, the saturation magnetization value ($\sigma S_B$) of the metal magnetic powder exposed to the constant temperature and constant humidity was similarly measured.

Here, the stability of the metal magnetic powder to the environment was evaluated by calculating a decreasing rate (Δσs) of the weather resistance by (Formula 4).

$$\Delta \sigma_s = \{(\sigma S_A) - (\sigma S_B)\}/(\sigma S_A) \times 100 \quad \text{(Formula 4)}$$

<Magnetic Characteristic Evaluation of a Single Magnetic Layer on a Film>

In order to confirm a possibility of applying the metal magnetic particle of the present invention to a medium, the single magnetic layer using the metal magnetic particle of the present invention was formed on a prescribed base film.

The coercive force Hcx (Oe, kA/m), and a coercive force distribution $SFD_x$ in a direction parallel to the surface of a magnetic layer of the single magnetic layer on the tape, were evaluated.

A confirmation method of the possibility of applying the metal magnetic particle to the medium, will be described.

0.35 g of the metal magnetic powder of the present invention was weighed and put in a pot (having an inner diameter: 45 mm, and a depth: 13 mm), and was left to stand still for 10 minutes with the lid kept open. Next, vehicle (mixture solution of vinyl chloride resin MR-555 (20 mass %) by ZEON CORPORATION, vylon (registered trademark) UR-8200 (30 mass %) by TOYOBO CO. LTC, cyclohexanone (50 mass %)), acetyl asenon (0.3 mass %), and stearic acid-n-butyl (0.3 mass %) 0.7 mL was added into the pot using a micropipette. Then, steel balls (20) 30 g and 10 nylon balls (8φ) were added into the pot, and the pot was left to stand still for 10 minutes with the lid kept closed.

Thereafter, the pot was set in a centrifugal ball mill (FRITSCH P-6 by FRITSCH CORPORATION), and number of rotations was slowly increased and adjusted to 600 rpm, to thereby cause dispersion for 60 minutes. After the centrifugal ball mill was stopped, the pot was taken out. 1.8 mL of a regulating agent in which methyl ethyl ketone and toluene were previously mixed in a ratio of 1:1 was added into the taken-out pot using the micropipette. Thereafter, the pot was set in the centrifugal ball mill again, to cause dispersion at 600 rpm for 5 minutes, to thereby fabricate a magnetic coating material according to the present invention.

Next, the lid of the pot was opened to remove the nylon ball, and the magnetic coating material was put into an applicator (550 μm) together with the steel ball, to thereby apply the magnetic coating material on the base film (polyethylene film 15C-3500, film thickness: 15 μm). The base film was placed at a center of a coil of an orientation container of 5.5 kG speedily without pausing, and the magnetic coating material was oriented and was magnetized and thereafter dried, to thereby fabricate a magnetic tape. The thickness of the coating after drying was 4 μm. In order to clearly confirm the effect of the metal magnetic powder of the present invention, a magnetic single layer tape was fabricated without forming a non-magnetic layer. Note that calendar processing was not applied thereto.

Magnetic measurement was performed to the magnetic tape being a medium fabricated as described above, using the VSM apparatus (VSM-7P) by TOEI INDUSTRY CO., LTD, to thereby obtain the coercive force Hcx (Oe, kA/m), and a coercive force distribution $SFD_x$ in a direction parallel to the surface of the magnetic layer.

Then, it is found that the magnetic tape fabricated using the magnetic coating material of the present invention, exhibits excellent tape magnetic characteristic suitable for the high density magnetic recording, which is the tape magnetic characteristic that the coercive force $H_{cx}$ is high, and the coercive force distribution $SFD_x$ is low (see examples and comparative examples as will be described later).

As described above, it appears that this is a result of exhibiting an excellent compatibility effect by improving affinity with coating resin, because the isoprotic point of the magnetic powder of the present invention is 7.0 or more in a coating film, and a result of excellent dispersibility into the organic solvent, because the powder pH value of the magnetic powder of the present invention is 7.0 or more, and further a result of excellent orientation of the magnetic powder in the coating film by securing the basic point (stearic acid adsorption amount per unit area is 1.2 mg/m² or more).

EXAMPLES

The metal magnetic powder and the method for producing the same according to the present invention will be described hereafter, with reference to examples.

Example 1

3000 mL of pure water was put in a beaker of 5000 mL, and thereafter 0.03 mol/L of cobalt sulphates (special grade reagent) solution and 0.15 mol/L of ferrous sulphates (special grade reagent) solution were mixed in a molar ratio of Co:Fe=1:4, while a temperature was maintained to 30° C. by a temperature controlling machine. Then, granular sodium carbonate in which 5-equivalent amount of carbonic acid was contained with respect to Fe+Co, was directly added into the mixed solution 500 mL, to thereby fabricate a suspension mainly composed of ferrous carbonate, while adjusting a liquid temperature so as not to exceed a range of 35±5° C. The suspension was matured for 90 minutes, and thereafter air adjusted so that an oxidation rate of Fe ion is 15%, was added at a flow rate of 100 mL/minute, to thereby form a nucleus crystal. Then, the liquid temperature was increased to 60° C., and pure oxygen was circulated at a flow rate of 30 mL/minute, to continue oxidation for 90 minutes. Thereafter, the pure oxygen was switched to nitrogen, and nitrogen was circulated, and the suspension was matured for 45 minutes.

Next, the liquid temperature was decreased to 40° C. to stabilize the temperature, and thereafter aluminum sulfate aqueous solution of 1.0 mass % of Al was continued to be added for 25 minutes at an addition rate of 5.0 g/minute, to thereby grow iron oxyhydroxide. Thereafter, the pure oxygen was continued to be circulated at a flow rate of 50 mL/minute, to thereby complete oxidation. Note that, the end of the oxidation was confirmed by partially taking-up the supernatant liquid and adding potassium ferrocyanide solution, and confirming whether liquid color was not changed.

300 g of sulfuric acid aqueous solution of yttrium oxide (containing 2.0 mass % of yttrium) was added into the liquid after end of the oxidation, to thereby obtain a powder (cake) of Al-doped iron oxyhydroxide with yttrium deposited on its surface.

The cake of the iron oxyhydroxide was filtered and washed by water, and thereafter was dried for 6 hours at 130° C., to thereby obtain a dried solid matter of the iron oxyhydroxide. 10 g of The dried solid matter thus obtained was put in a bucket, which was then placed in the atmosphere while adding steam at a water flow rate of 1.0 g/minute and was sintered at 450° C., to thereby obtain an iron-based oxide mainly composed of α-iron oxide (hematite).

The iron-based oxide mainly composed of the α-iron oxide was charged into an air-permeable bucket. Then, the bucket was mounted in a through-type reducing furnace, and reduction processing was applied to the iron-based oxide in the bucket by performing sintering for 30 minutes at 400° C. while circulating hydrogen gas at a flow rate of 40 L/minute and supplying steam at a water flow rate of 1.0 g/minute. After the end of the reducing processing, supply of the steam was stopped, and the temperature was raised to 600° C. at a temperature rise rate of 15° C./minute under a hydrogen atmosphere. Thereafter, high temperature reducing processing was performed for 60 minutes while supplying steam at a water flow rate of 1.0 g/minute, to thereby obtain iron-based alloy powder (metal magnetic powder as an intermediate product).

0.05 mol/L of sodium tartrate being a complexing agent, and 0.1 mol/L of ammonium sulfate being a buffer solution, were mixed into 900 mL of pure water, as process liquid for performing elution processing of the iron-based alloy powder, to thereby prepare the process liquid with pH adjusted to pH=9 by $NH_3$. Then, 10 g of the iron-based alloy powder that has undergone the aforementioned high temperature reduction processing was charged into this process liquid and the temperature was maintained to 30° C., and thereafter sodium borohydride being the reducing agent was added at a rate of 0.3 mol/L, and the mixed solution was matured while stirring for 30 minutes at 30° C., to thereby obtain slurry.

Then, aqueous hydrogen peroxide obtained by diluting 4.0 g of 35% hydrogen peroxide with 17.8 g of pure water was added into the obtained slurry, and the mixed solution was matured for 30 minutes while stirring. Thereafter, the metal magnetic particle was precipitated from the slurry by decantation, and the supernatant liquid was removed. Then, 100 mL of pure water was added to the precipitated metal magnetic particle, and a mixed solution was stirred for 30 minutes again, to thereby wash the metal magnetic particle with water. Then, the metal magnetic particle was precipitated by decantation again, and the supernatant liquid mainly composed of water was removed.

After removing the supernatant liquid mainly composed of water, ethanol 500 mL was added to the precipitated metal magnetic particle, which was then stirred similarly to the aforementioned washing by water at a normal temperature, to thereby exhibit affinity between the metal magnetic particle and the ethanol. Thereafter, the metal magnetic particle was precipitated by decantation, and the supernatant liquid was removed. A series of operation of adding ethanol to the precipitated metal magnetic particle, stirring, and removing the ethanol (also described as a solvent replacement operation (1) in the present invention in some cases) was repeated five numbers of times.

After the supernatant liquid mainly composed of ethanol was removed, toluene 500 mL was added to the precipitated metal magnetic particle, and stirring was performed at a normal temperature similarly to the aforementioned solvent replacement operation (1), to thereby exhibit affinity between toluene and the metal magnetic powder. Thereafter, the metal magnetic powder was decanted, and the supernatant liquid was removed. A series of operation of adding toluene to the precipitated metal magnetic particle, stirring, and removing the toluene (also described as a solvent replacement operation (2) in the present invention in some cases) was repeated four numbers of times. However, in a final stage of the solvent replacement operation (2), the supernatant liquid was not removed and toluene dispersion slurry of the metal magnetic particle was obtained, and the processing was advanced to the next step.

The obtained toluene dispersion slurry of the metal magnetic particle was subjected to centrifugal separation processing at 4000 rpm for 10 minutes, to thereby forcibly precipitate the metal magnetic particle. Thereafter, the supernatant liquid was removed to collect the metal magnetic particle, which was then dried for 12 hours at 40° C. in a nitrogen atmosphere, to thereby obtain dried powder of the metal magnetic particle with its surface treated by toluene.

The composition of the metal magnetic powder of example 1 was represented by Co/Fe=24 at %, Al/(Fe+Co)=6.8 at %, Y/(Fe+Co)=6.9 at %, and non-magnetic component (Al+Y)/magnetic component (Fe+Co)=13.7 at %.

Further, results of surface property evaluation (proton releasing and absorbing property of the metal magnetic particle of example 1) are shown in FIG. 2.

Note that similarly to FIG. 1, FIG. 2 shows a graph in which the pH value of the reference (blank solution) is taken on the horizontal axis, and the number of $(H^+)/m^2$ [releasing or absorbing] the proton into the solution by the metal magnetic particle is taken on the vertical axis. Then, the metal magnetic powder of example 1 is plotted by ♦ and solid line, and the metal magnetic powder of comparative example 1 as will be described later is plotted by □ and broken line.

Regarding the obtained metal magnetic powder of example 1, table 1 shows results of measurement of the shape and the volume of the metal magnetic particle, the specific surface area (BET) of the metal magnetic particle, the surface property evaluation (powder pH value) of the metal magnetic particle, the isoprotic point of the metal magnetic particle, the crystallite size of the metal magnetic powder, the crystallite volume and the number of crystallites, the bulk density, and measurement of organic acid (stearic acid) adsorption amount of the metal magnetic particle. Subsequently, magnetic characteristic evaluation of the metal magnetic powder and magnetic characteristic evaluation of the single magnetic layer on the magnetic tape were executed, and table 2 shows the measurement results.

Example 2

An operation similar to example 1 was performed, excluding a point that the operation of "aqueous hydrogen peroxide obtained by diluting 35% hydrogen peroxide 4.0 g with 17.8 g of pure water was added into the obtained slurry, and the mixed solution was matured for 30 minutes while stirring" described in example 1 was changed to "aqueous hydrogen peroxide obtained by diluting 2.0 g of 35% aqueous hydrogen peroxide with 17.8 g of pure water was added into the obtained slurry". Table 1 shows results of measurement of physical properties of the obtained metal magnetic powder, and table 2 shows results of magnetic characteristic evaluation of the single magnetic layer on the magnetic tape.

Examples 3 to 5

In the "solvent replacement operation (2)" described in example 1, an operation similar to example 1 was performed, excluding a point that a solvent used for replacement was substituted with methyl ethyl ketone in example 3, cyclohexane in example 4, and ethanol in example 5, respectively. Table 1 shows the obtained results of the measurement of the physical properties of the metal magnetic powder, and table 2 shows the results of the magnetic characteristic evaluation of the metal magnetic powder and the magnetic characteristic evaluation of the single magnetic layer on the magnetic tape.

Comparative Example 1

The dried powder was obtained not by the wet-type stabilizing method descried in example 1, but by a method of the conventional technique (for example, the method described in Japanese Patent Laid Open Publication No. 2007-294841).

More specifically, the step of charging the iron-based oxide mainly composed of α-iron oxide into the through-type reducing furnace and applying reduction processing thereto, and thereafter applying high temperature reduction processing to obtain the iron-based alloy powder (the metal magnetic powder as the intermediate product) and applying elution processing to obtain slurry, was executed as described in example 1.

Next, the slurry obtained after mature for 30 minutes at 30° C. was separated into solid and liquid components, so that a solid component and a filtrate were recovered. The recovered solid component was filtered, washed by water and dried, to thereby obtain an intermediate dried product.

Oxidation processing was applied to the intermediate dried product, to thereby form an oxide layer. More specifically, the intermediate dried product was put in the air-permeable bucket, and this bucket was mounted in the through-type reducing furnace.

In an initial stage of forming the oxide layer, mixed gas in which nitrogen and pure oxygen are mixed at a mixing ratio of nitrogen 50 L/min and pure oxygen 400 Ml/min, was supplied into the furnace, and steam was supplied as water at an introduction rate of 1.0 g/min, to thereby form the oxide layer on the surface of the intermediate dried product in a mixture atmosphere of steam, oxygen, and nitrogen.

Oxygen concentration in the atmosphere was increased by gradual increase of a supply amount of air in a stage of suppressing heat generation which is caused by the oxidation of the surface of the intermediate dried product. Final supply flow rate of the pure oxygen was set to 2.0 L/min. At this time, total amount of the gas introduced into the furnace was maintained to be approximately constant by adjusting the supply flow rate of nitrogen. The oxidation processing was executed for 1 hour under an atmosphere in which the temperature was maintained approximately to 90° C.

Powder of the intermediate dried product after forming the oxide layer by the oxidation processing, was exposed for 30 minutes under hydrogen atmosphere at 250° C., to thereby perform reduction processing again. Thereafter, the operation similar to the aforementioned oxidation processing was executed again, to thereby perform stabilization processing of stabilizing the intermediate dried powder, and obtain the metal magnetic powder of comparative example 1.

The surface property of the metal magnetic powder of comparative example 1 thus obtained, was shown in tables 1, and 2 and was plotted by □ and broken line in FIG. 2.

Regarding the metal magnetic powder of comparative example 1 thus obtained, table 1 shows the results of measuring the physical properties of the metal magnetic powder, and table 2 shows the results of the magnetic characteristic evaluation of the metal magnetic powder and the magnetic characteristic evaluation of the single magnetic layer on the magnetic tape.

TABLE 1

| | Particle physical property value | | | | | | | | | | |
|---|---|---|---|---|---|---|---|---|---|---|---|
| | Long axial length (nm) | Short axial length (nm) | Particle volume (nm³) | BET (m²/g) | Powder pH | Isoprotic point | Crystallite size (nm) | Crystallite volume (nm³) | Number of crystallites (numers) | Bulk density (g/cc) | Adsorption amount of stearic acid | |
| | | | | | | | | | | | (mg/g) | (mg/m²) |
| Example 1 | 29.92 | 4.84 | 2200 | 85.9 | 8.5 | 8.3 | 9.3 | 421.2 | 5.2 | 0.51 | 122.0 | 1.42 |
| Example 2 | 30.41 | 4.74 | 2150 | 86.9 | 7.6 | 7.8 | 9.2 | 407.7 | 5.3 | 0.48 | 115.6 | 1.33 |

TABLE 1-continued

| | Particle physical property value | | | | | | | | | | |
|---|---|---|---|---|---|---|---|---|---|---|---|
| | Long axial length | Short axial length | Particle volume | BET | Powder | Isoprotic | Crystallite size | Crystallite volume | Number of crystallites | Bulk density | Adsorption amount of stearic acid | |
| | (nm) | (nm) | (nm$^3$) | (m$^2$/g) | pH | point | (nm) | (nm$^3$) | (numers) | (g/cc) | (mg/g) | (mg/m$^2$) |
| Example 3 | 31.47 | 4.70 | 2180 | 87.0 | 7.7 | 7.9 | 9.0 | 381.7 | 5.7 | 0.50 | 125.0 | 1.44 |
| Example 4 | 29.78 | 4.86 | 2210 | 88.0 | 8.0 | 8.2 | 9.1 | 394.6 | 5.6 | 0.47 | 123.0 | 1.40 |
| Example 5 | 28.59 | 5.00 | 2248 | 87.6 | 8.3 | 8.3 | 9.0 | 381.7 | 5.9 | 0.48 | 124.5 | 1.42 |
| Com* Example[1] | 30.92 | 4.70 | 2148 | 80.9 | 6.3 | 6.5 | 9.3 | 421.2 | 5.1 | 0.32 | 60.9 | 0.75 |

Com* . . . Comparative example 1

TABLE 2

| | Magnetic characteristic | | | | | Weather resistance | Tape magnetic characteristic | | |
|---|---|---|---|---|---|---|---|---|---|
| | Coercive force | | | Saturation magnetization | | | Coercive force | | |
| | (Oe) | (kA/m) | (kA/m/nm$^3$) | (Am$^2$/kg) | (Am$^2$/kg/nm$^3$) | (%) | (Oe) | (kA/m) | SFDx |
| Example 1 | 2226 | 177.1 | 0.081 | 103.7 | 0.047 | 29.5 | 2700 | 214.9 | 0.566 |
| Example 2 | 2279 | 181.4 | 0.084 | 109.5 | 0.051 | 34.1 | 2811 | 223.7 | 0.521 |
| Example 3 | 2233 | 177.7 | 0.082 | 102.9 | 0.047 | 28.7 | 2769 | 220.4 | 0.576 |
| Example 4 | 2250 | 179.0 | 0.081 | 110.2 | 0.050 | 31.0 | 2811 | 223.7 | 0.530 |
| Example 5 | 2255 | 179.4 | 0.080 | 108.2 | 0.048 | 29.2 | 2758 | 219.5 | 0.545 |
| Com* example[1] | 2228 | 177.3 | 0.083 | 106.0 | 0.049 | 15.0 | 2490 | 198.1 | 0.620 |

Com* . . . Comparative example 1

Conclusion of Examples 1 to 5 and Comparative Example 1

From table 1 it is found that samples of examples 1 to 5 and comparative example 1 show approximately the same results regarding a shape-wise property of the metal magnetic particle. However, it is also found that there is a great difference regarding the stearic acid adsorption amount, the isoprotic point, and the powder pH value, between the samples of examples 1 to 5 and the sample of comparative example 1.

The reason is considered as follows. A problem of contamination is solved, which is the contamination of the surface by some component due to non-magnetic component reduction processing, and the metal magnetic powder with high dispersibility into resin is obtained, although the non-magnetic component and the volume of the metal magnetic particle are reduced by performing the reduction processing, because the degradation of the surface property is recovered which is the degradation generated by the reduction processing of reducing the non-magnetic component by solvent replacement operations (1) and (2).

From table 2, it is found that the magnetic characteristic of the bulk body of the metal magnetic particle shows approximately the same results in examples 1 to 5 and comparative example 1.

However, when the bulk body of the metal magnetic particle was made into a medium as a tape, it was found that the tape according to examples 1 to 5 had a high coercive force compared with the tape of comparative example 1, and a coercive force distribution (SFD$_x$) was narrow.

The reason is considered as follows. As described above, the affinity with the coating resin is improved because the isoprotic point of the magnetic powder in the coating film is 7.0 or more, and the dispersibility into the organic solvent is excellent because the powder pH value of the magnetic powder is 7.0 or more, and excellent magnetic characteristic is exhibited which is suitable for the high density magnetic recording, which is the magnetic characteristic of high coercive force H$_{cx}$ and low coercive force distribution SFD$_x$ in the magnetic recording medium such as tape because the basic point of the magnetic powder in the coating film is secured (the stearic acid adsorption amount per unit area is 1.2 mg/m$^2$ or more), and an excellent orientation is obtained.

INDUSTRIAL APPLICABILITY

According to the magnetic powder of the present invention, the magnetic recording medium suitable for the high density magnetic recording can be provided.

The invention claimed is:
1. A metal magnetic powder comprising particles having a metal magnetic phase mainly composed of ferromagnetic elements, containing one or more kinds of elements selected from a group consisting of rare earth elements including Y, Al, and Si, and having an oxide layer, wherein
an isoprotic point is 7.0 or more;
an average long axial length of a particle is 10 to 50 nm;
an average particle volume of the particle including an oxide layer is 5000 nm$^3$ or less; and
a value of (R+Al+Si)/(Fe+Co) atomic ratio calculated using a value of a content (atom %) of each element contained in the particle is 20% or less,
wherein
R is a rare earth element containing Y, and a content of one kind or two kinds selected from the group consisting of R, Al, and Si, is 0 in some cases, and
an adsorption amount of stearic acid per unit area, absorbed on the particles is 1.2 mg/m$^2$ or more.

2. The metal magnetic powder according to claim 1, wherein a powder pH value measured by a boiling extraction method (JISK-5101-17-1:2004) is 7.0 or more.

3. The metal magnetic powder according to claim 1, wherein a crystallite size calculated by Fe(110) is 11.5 nm or less, and an average value of the number of crystallites present in the particle obtained by dividing the average particle volume V($nm^3$) of the particles by a crystallite volume ($nm^3$) calculated as a spherical shape, is 6.0 or less.

4. A magnetic coating material including the metal magnetic powder described in claim 1.

5. A magnetic recording medium including the metal magnetic powder described in claim 1.

6. A method for producing the metal magnetic powder described in claim 1 comprising the step of:

eluting the non-magnetic components in the particles under an action of a reducing agent acting on the metal magnetic powder, in a solution containing a complexing agent capable of forming the complex with the non-magnetic components; and forming an oxide layer on the particles in the solution after eluting the nonmagnetic components into the solution, without drying the particles.

7. The method for producing a metal magnetic powder according to claim 6, wherein the step of forming the oxide layer is the step of oxidizing the particle by peroxide, in a state that the non-magnetic components are eluted into the solution.

8. The method for producing a metal magnetic powder according to claim 6, comprising the step of dispersing the particles in pure water after the step of forming the oxide layer, and replacing the pure water by an organic solvent.

9. The method for producing a metal magnetic powder according to claim 6, comprising the step of drying the particles after the step of forming the oxide layer.

* * * * *